Dec. 8, 1936.                M. OLLEY                 2,063,747
                          SPRING SUSPENSION
                       Filed Aug. 22, 1935        3 Sheets-Sheet 1

Inventor
Maurice Olley
By Blackmore, Spencer & Flint
Attorneys

Dec. 8, 1936.   M. OLLEY   2,063,747
SPRING SUSPENSION
Filed Aug. 22, 1935   3 Sheets-Sheet 2

Inventor
Maurice Olley

By Blackmore, Spencer & Flint
Attorneys

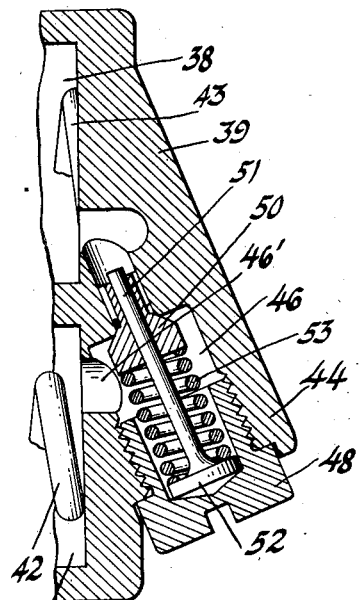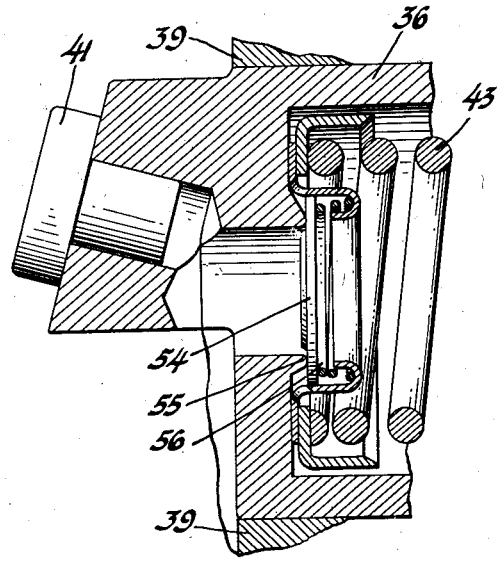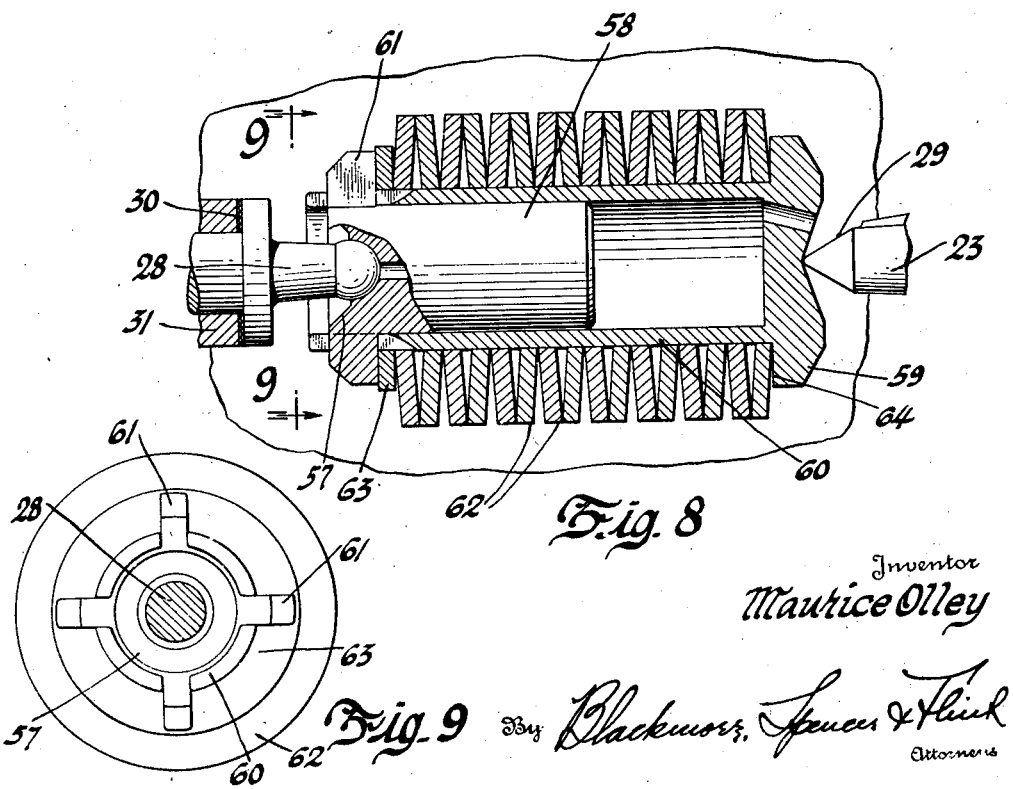

Patented Dec. 8, 1936

2,063,747

UNITED STATES PATENT OFFICE 2,063,747

SPRING SUSPENSION

Maurice Olley, Detroit, Mich., assignor to General Motors Corporation, Detroit, Mich., a corporation of Delaware Application August 22, 1935, Serial No. 37,311

20 Claims. (Cl. 267—57)

This invention relates to motor vehicles having independent suspension of a pair of road wheels in which each road wheel is supported at the end of a lever arm oscillating in a substantially vertical plane about an axis on the vehicle. It relates particularly to such suspension systems in which the lever arm normally oscillates in a substantially vertical plane substantially parallel to the longitudinal axis of the vehicle, about an axis transverse thereof. It is equally applicable whether the road wheels are dirigible or not.

In known constructions for dirigible road wheels, each wheel supporting lever arm has been mounted on a substantially horizontal pivot axis carried in a bracket which swings in a substantially horizontal plane about a substantially vertical king pin mounted directly on the vehicle frame, the movement of the lever arm in a substantially vertical plane relative to the bracket being resiliently resisted by coil spring means between the lever arm and the bracket.

Commonly, a separate reaction link has been required between the brake backing plate and the bracket, to take the brake reactions which would otherwise cause a turning of the wheel supporting lever arm about the axis of the wheel and consequent excessive diving or lifting of the end of the vehicle, upon heavy braking deceleration.

The object of the present invention is an improvement and simplification of the above type of suspension system, in which the need for a reaction link is eliminated and in which there is considerable saving of weight.

A more specific object of the invention is a suspension system of the foregoing character in which movement of the wheel supporting lever arm is resiliently resisted by a spring of the torsion rod type.

Another object of the invention is a suspension system in which means are provided for varying the effective rate of a torsion rod spring.

A still further object of the invention is to vary the effective rate of the torsion rod spring by reducing its inherent rate in its position of normal deflection and increasing its effective rate with increasing deflections in either direction away from normal.

The above and other objects of the invention will be apparent as the description proceeds.

According to the invention, the wheel supporting lever arm is mounted on a tubular pivot axis, within which is attached one end of a short stiff torsion rod, of which the other end is attached to the end of a torsion tube which encloses the remainder of the rod and has its other end attached to the vehicle frame or to a swinging bracket mounted on a king pin for dirigible movement in the case of a dirigible wheel. In this way the torsion rod is nested within a torsion tube which is torsionally stressed in series with the rod, whereby the effect of a longer rod is obtained within shorter overall dimensions. Suitable bearings are provided for the tubular pivot axis in the bracket.

Attached to the tubular pivot axis which in its turn is attached to the torsion rod, is a lever arm which constitutes one link of a toggle which is loaded by auxiliary spring means assisting deflection of the rod, in either direction from its normal load position, to a lessening extent with increasing deflections of the torsion rod.

The toggle is "straight" in the normal load position of the wheel supporting lever arm and the movable end of the torsion rod spring, and the auxiliary spring exerts a maximum pressure on the toggle, axially of the "links" thereof, thereby softening or reducing the rate of the torsion rod spring when the toggle is straight, and a reducing pressure as the two "links" of the toggle move into positions of increasing angular relationship to each other, whereby the effective rate or stiffness of the spring is increased with increasing torsional deflections of the end thereof in either direction away from its normal position.

The drawings show the application of the invention to a suspension system in which the pivot axis of the wheel supporting lever arm and the wheel spindle axis are in non-parallel relationship to each other and normally lie in two substantially horizontal parallel planes. Such a construction is equivalent to the construction shown in copending application S. N. 740,261, except that the pivot and spindle axis of each wheel supporting lever arm do not lie in a common plane because the wheel supporting lever arm is not horizontal in its normal position and the pivot axis thereof is closer to the road than the wheel spindle axis.

In the drawings:

Figure 6 is an enlarged sectional view of a part of Figure 4.

Figure 7 is an enlarged sectional view of another part of Figure 4.

Figure 8 shows in sectional elevation, an alternative form of auxiliary spring means.

Figure 9 is a view on line 9—9 of Figure 8.

Figure 1:
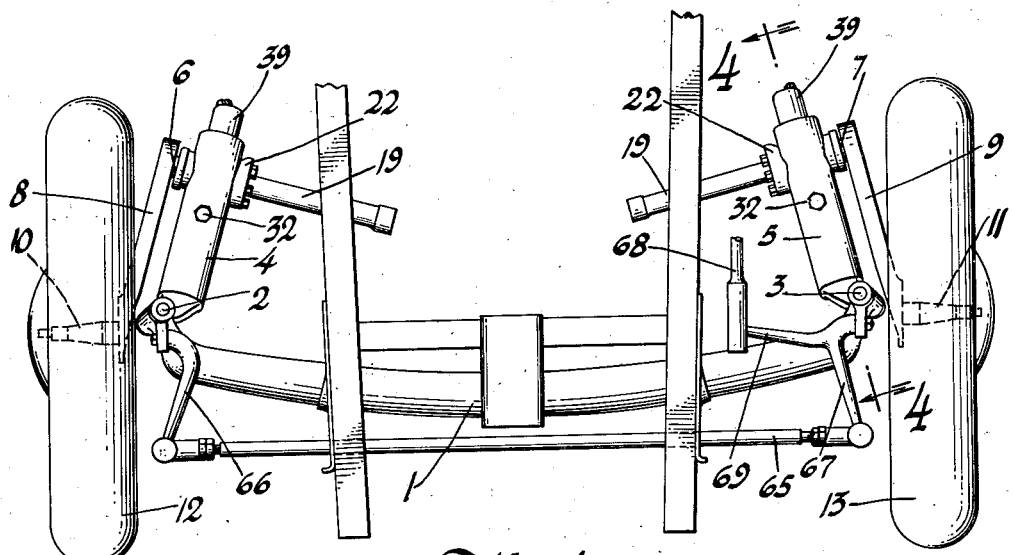
Figure 1 is a plan view of the front end of a motor vehicle frame with suspension means for the front dirigible wheels according to the invention.

The vehicle frame includes a transverse member 1 rigidly attached thereto. Mounted at each end of the transverse member 1 for pivotal movement in a substantially horizontal plane about pivot axes constituted by king pins 2 and 3, are brackets 4 and 5.

The brackets 4 and 5 extend from their king pins towards the rear of the vehicle and at their rearward ends provide support for the substantially horizontal tubular pivot axes 6 and 7 of wheel supporting lever arms 8 and 9 respectively, carrying spindles 10 and 11 for road wheels 12 and 13. The wheel supporting lever arms extend forwardly from their tubular pivot axes.

The pivot and spindle axes of each wheel supporting lever arm normally lie in two substantially horizontal parallel planes and in vertical planes intersecting each other, on the vehicle side of the wheel.

The suspension is arranged to have the usual caster effect in the normal position, by providing that the wheel spindle axis lies in a vertical plane perpendicular to the normally vertical longitudinal mid-plane of the vehicle, and passing to the rear of the intersection of the king pin axis produced, and the road. The king pin may be inclined or not as desired. The usual camber and "toe in" of the wheel in the normal position may be provided in the disposition of the pivot axes of the lever arms.

As shown in the drawings, the king pin axis is inclined rearwardly from its point of intersection with the ground, and is disposed to the rear of the wheel spindle axis. The swinging bracket extends substantially normal to the king pin axis and normally to the rear thereof and therefore is inclined downwardly and rearwardly therefrom, in its normal position. The longitudinal axis of the wheel supporting lever arm lies, in its normal load position, in, or parallel to, a plane substantially normal to the axis of the king pin and containing the swinging bracket. The downward and rearward inclination of these parts from the axis of the king pin and the wheel spindle axis, reduces the brake reaction tending to turn the wheel supporting lever arm about its pivot axis and facilitates provision for dirigible movement of the wheels by providing increased clearance between the parts and the vehicle frame.

Because the wheel supporting lever arm extends forwardly and upwardly from its pivot axis, there is an increasing caster effect upon a deflection of the wheel spindle, upwardly from its normal position, relatively to the vehicle frame. Upon a downward deflection of the wheel spindle, from its normal position, relatively to the vehicle frame, there is, for small deflections, a slight reduction in the degree of caster due to the upward inclination of the wheel supporting lever arm, but for downward deflection of any magnitude, the degree of caster is increased.

In cornering the increasing caster effect—at least on the outer more heavily loaded wheel—is advantageous in offsetting the effect of centrifugal force on the masses of the suspension unit which are chiefly to the rear of the king pin axis.

The downward inclination of the wheel supporting lever arm brings the pivot axis thereof closer to the line of action of the braking reaction at the road, thereby reducing the moment arm thereof about the pivot axis of the lever arm and hence reducing the tendency of the front end of the vehicle to lift as a result of the braking reaction.

Figure 4:
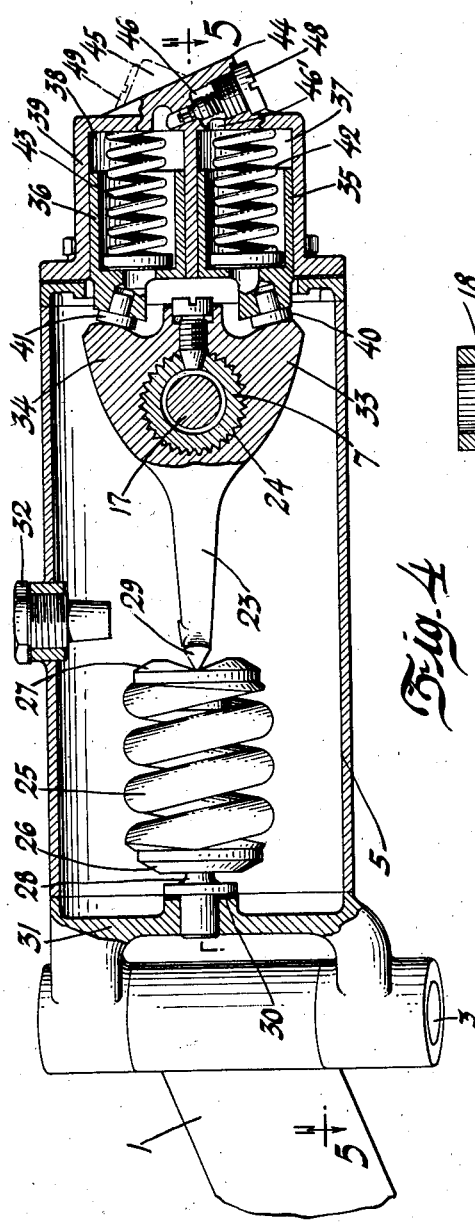
Figure 4 is an enlarged view, partly in section, on line 4—4 of Figure 1.
Figure 5:
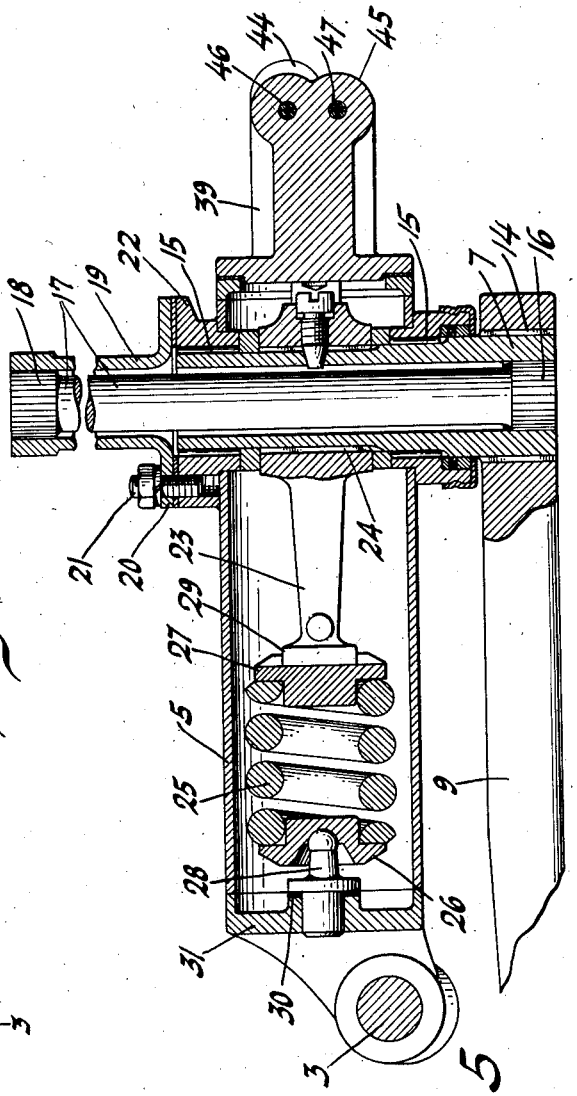
Figure 5 is a section on line 5—5 of Figure 4.

Referring now to Figures 4 and 5, the end of the wheel supporting lever arm 9 is fastened on the tubular pivot axis 7 through the medium of suitable inter-engaging serrations 14 on these parts. The tubular pivot axis 7 is supported in needle bearings 15 in the bracket 5.

Fastened within the bore of the tubular pivot axis 7 through the medium of serrations 16, at that end thereof carrying the wheel supporting lever arm 9, is a torsion rod 17, extending inwardly of the vehicle therefrom. The inner end of this torsion rod 17 is provided with serrations 18 engaging the serrated bore of a torsion tube 19, which encloses the remaining portion of the torsion rod extending inwardly of the vehicle from the tubular pivot axis 7 in the bracket 5. The other end of the torsion rod tube 19 is flared to provide a flange 20, by which through the medium of set screws such as 21, it is fixed to a boss 22 on the bracket 5. It will be seen that the torsion rod 17 in series with its enclosing torsion tube 19, torsionally resists pivotal movement of the wheel supporting lever arm about its pivot axis provided by the tubular member 7, and thus constitutes a means resiliently resisting upward and downward deflections of the wheel spindle 11, relative to the frame.

The bracket 5 constitutes a housing for a lever arm 23 which is attached to the tubular pivot axis 7 through the medium of inter-engaging serrations 24 between the parts.

The lever arm 23 constitutes one link of a toggle which is loaded by auxiliary spring means 25, assisting, through the tubular member 7, torsional deflection of the end 16 of the combined torsion spring 17, 19, relatively to the fixed end 20 thereof, in either direction away from its normal load position. As a result of the toggle connection, the auxiliary spring 25 assists torsional deflection of the torsion spring to a lessening extent with increasing deflections thereof in either direction away from its normal position.

The auxiliary spring 25 is provided with seatings 26 and 27, seating respectively on a ball-ended abutment 28 in the end of the housing 5 and a knife edge 29 formed on the end of the lever arm 23.

The seating 27 is V shaped where it bears on the knife edge 29 of the lever arm 23, while the seating 26 is spherically cupped where it bears on the ball-ended abutment 28. The ball joint thus formed at one end of the auxiliary spring insures uniform loading across the face of the knife edge 29 at the other end thereof, where the rubbing friction is greatest.

Suitable shims 30 may be inserted between the ball-ended abutment member 28 and the end 31 of the housing 5, in order to vary the compression of the spring 25. A combined stop and filler plug 32 is provided in the housing 5, which limits upward movement of the lever arm 23, and hence the degree of movement of the wheel supporting lever arm 9 upwardly relatively to the vehicle frame. The housing can be filled with oil through the filler plug 32.

Referring now to Figures 4, 6, and 7. A pair of lugs 33 and 34 on the lever arm 23 constitute cams coacting each with pistons 35 and 36 in cylinders 37 and 38 respectively of a hydraulic damper in a double cylinder block 39 forming a closure for that end of the housing 5 containing the tubular pivot axis 7. Small buttons 40 and 41 on the pistons 35 and 36 provide inclined contact faces preventing cocking of the pistons under load through cams 33 and 34. The pistons are urged into contact with the cams by coil springs 42 and 43.

At the outer end of the cylinder block 39 are two oppositely inclined bosses 44 and 45. The boss 44 has a bored and counterbored hole 46 opening into the cylinder 38. Between the counterbore of hole 46 and the cylinder 37 is a hole 46' completing a passageway from the cylinder 38 into the cylinder 37. The boss 45 is similarly bored and counterbored with a hole 47 leading to the cylinder 37 and with passageway (not shown) from the counterbore into the cylinder 38. The outer ends of the counterbores are closed by screwed plugs 48 and 49.

As shown most clearly in Figure 6, within each counterbore such as 46 is a valve 50. The valve 50 slides on the stem portion 51 of a valve guide having a head 52 seating in the plug 48. Between the valve 50 and the head 52 of the valve guide is a spring 53 resiliently urging the valve 50 on to its seating in the counterbore 46. The bores 46 and 47 thus provide passages for the flow of oil from the cylinder 38 into the cylinder 37 and from the cylinder 37 into the cylinder 38 respectively.

Referring now particularly to Figure 7, valves such as 54 are yieldingly urged on to seatings such as 55 in the pistons 35 and 36, by very light coil springs such as 56. These valves permit a comparatively free flow of oil from the housing 5 into the cylinders 37 or 38, whenever, due to leakage or the like, the pressure in either, may be less than the atmospheric pressure of the oil in the housing 5, thus maintaining the cylinders 37 filled with oil.

Assuming now, the cylinders 37 and 38 to be filled with oil, it will be seen that on upward deflection of the wheel supporting lever arm 9, and with it the lever arm 23, relatively to the vehicle frame, the cam 34 will force the piston 36 into the cylinder 38 and that the valve 50 will be forced off its seat in the counterbore 46 against the pressure of spring 53, and that the movement of the lever arm will be damped by the restricted flow of oil under pressure from the cylinder 38 into the cylinder 37. Simultaneously with the movement of piston 36 into the cylinder 38, the piston 35, urged by the spring 41 and by the pressure of oil from the cylinder 38, will follow the retractive movement of the cam 33 away from piston 35. Throughout the above movement of the wheel supporting lever arm, the valve in the bore 47 will remain closed.

Upon a downward deflection of the wheel supporting lever arm 9, and with it the lever arm 23, relatively to the vehicle frame, the above operation as between the valves 50 in the bores 46 and 47 of the bosses 44 and 45 of the respective cylinders 37 and 38 is reversed; the valve in the bore 47 will be opened and the downward movement of the lever arm will be damped by a restricted flow of oil under pressure from the cylinder 37 into the cylinder 38 while the valve in the bore 46 will remain closed.

The elements within the housing bracket 4 are similar and their operation is like that of the parts shown in Figures 4, 5, 6, and 7 in conjunction with the bracket housing 5 and the foregoing description is of course equally applicable thereto.

Referring now to Figures 8 and 9 showing a modification of the seatings 26 and 27 of Figures 4 and 5, adapting them for use with a Belleville washer type of auxiliary spring, alternative to the coil springs 25 of Figures 4 and 5:—

The seating 57 seating on the ball-ended abutment 28 is provided with a stem portion 58 telescopically guided within a tubular portion 60 of the seating 59, seating on the knife edge 29 formed on the end of the lever arm 23. The end of the tubular portion 60 adjacent the ball-ended abutment 28 is provided with slots forming furcations through which extend radial lugs 61 on the seating 57. The seating 57 with its lugs 61 is capable of sliding axially of the tubular portion 60 and the slots therein. Externally of the tubular portion is a multiplicity of Belleville washers 62 which are packed between a washer 63 having as an abutment the lugs 61 of seating 57 and a flange 64 on the seating 59. As shown in Figure 8, the Belleville washers 62 are in a compressed condition.

Figure 2:
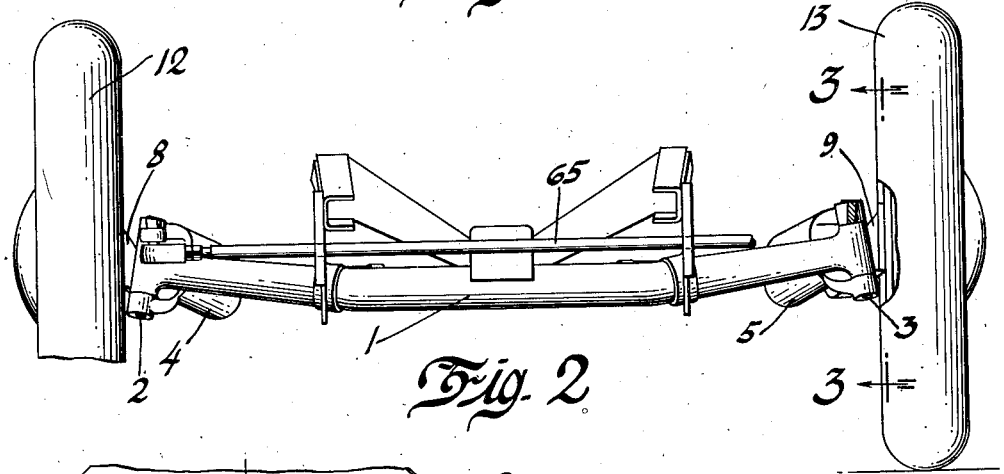
Figure 2 is a front elevational view of Figure 1.
Figure 3:
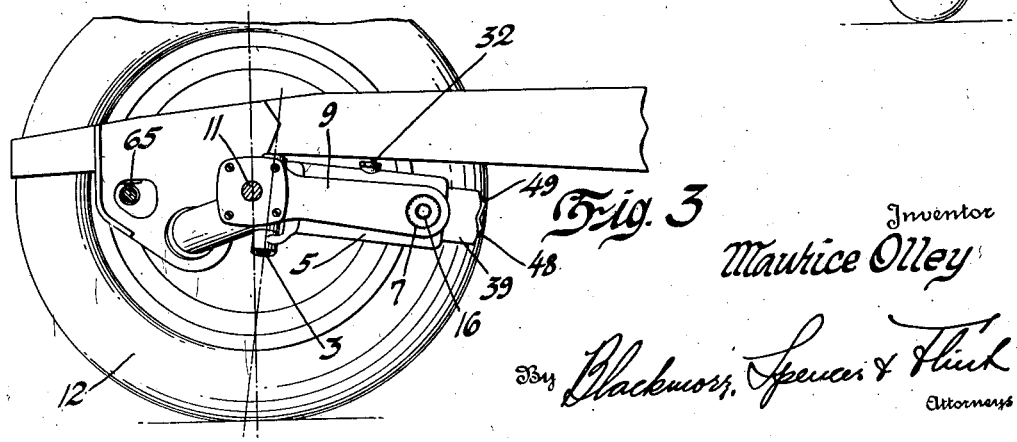
Figure 3 is a side elevation in the direction of the arrows 3—3 of Figure 2 with one wheel removed.

As shown in Figures 1 and 2 the dirigible wheels 12 and 13 are connected together for dirigible movement about their king pin axes by a tie rod 65 between steering arms 66 and 67 attached to the brackets 4 and 5 respectively. A drag link 68 constitutes the connection between the branch 69 of the steering arm 67 and a conventional steering gear (not shown).

It will be appreciated that a suspension system according to the invention and using a short stiff torsion rod spring from which a soft result is obtained by means of auxiliary means reducing its rate in the normal load position, provides a suspension in which a minimum weight of spring metal is required for a given rate; it enables a torsion rod spring to be used in a construction in which the use of a long torsion rod would be impracticable; and because of its variable rate it provides a soft or low rate suspension for riding comfort, and one whose rate increases with deflection for roll stability.

In conjunction with the use of a wheel supporting lever arm extending forwardly of the vehicle from its pivot axis, the need for a brake reaction link is reduced in a construction according to the invention, because the brake reaction acting through the wheel supporting lever arm tends to lift the front end of the vehicle in opposition to the weight transfer from rear to front, consequent upon braking deceleration, tending to depress the front end of the vehicle while a spring rate increasing with deflection further reduces the extent of any such deflections. When in addition the wheel supporting lever arm slopes downwardly from the wheel spindle axis to a pivot axis which is closer to the road, the need for a brake reaction link may be entirely eliminated because the lifting tendency of the brake reaction will be reduced to an amount which is offset by the depressing tendency of the weight transfer from rear to front.

I claim:

1. In a springing system of the torsion rod type which is subjected to a changing load, means reducing the inherent rate of the torsion rod spring in its normal load position and increasing the effective rate thereof as the load changes from normal and the torsion rod spring is deflected from its normal position, said means including an auxiliary spring acting on a lever arm rigidly connected to a part of the torsion rod which is torsionally deflected by the load.

2. A springing system according to claim 1, in which the auxiliary spring is constituted by a multiplicity of Belleville washer springs in series.

3. A springing system according to claim 1, in which the lever arm forms one link and the auxiliary spring constitutes the other link of a toggle which is straight in the normal load position.

4. The combination according to claim 1, in which the auxiliary spring is a coil spring in compression between a pair of seatings of which one has a bearing on the end of the lever arm and the other a bearing on a relatively fixed abutment, one of the said bearings being a knife edge bearing and the other a ball and cup bearing.

5. In a springing system of the torsion rod type which is subjected to a changing load, means reducing the inherent rate of the torsion rod spring in its normal load position and increasing the effective rate thereof as the load is increased or decreased from normal and the torsion rod spring is deflected from its normal position, said means including an auxiliary spring acting on a lever arm rigidly connected to a part of the torsion rod which is torsionally deflected by the load.

6. A springing system according to claim 5, in which the lever arm forms one link of a toggle which is straight in the normal load position, whereby the auxiliary spring exerts a maximum force assisting deflection of the torsion rod at or about the normal load position thereof, said auxiliary spring force becoming progressively less with increasing deflections of the torsion rod spring in either direction away from its normal load position.

7. A springing system according to claim 5, in which the auxiliary spring is a coil spring in maximum compression at normal load.

8. In a vehicle in which a road wheel is mounted on an axis supported by a wheel supporting lever arm capable of pivotal motion about an axis provided by a tubular pivot member, a torsion rod spring resiliently resisting pivotal motion thereof about the said pivot axis, said torsion rod spring extending through and having one end attached to one end of the tubular pivot member, and means reducing the inherent rate of the torsion rod spring in its normal load position and increasing the effective rate thereof as the load changes from normal and the torsion rod spring is deflected from its normal position, said means including an auxiliary spring acting on a part whose movement is a function of the deflection of the torsion rod spring.

9. In a vehicle in which a road wheel is mounted on an axis supported by a wheel supporting lever arm capable of pivotal motion about an axis provided by a tubular pivot member, a torsion rod spring resiliently resisting pivotal motion thereof about the said pivot axis, said torsion rod spring extending through and having one end attached to one end of the tubular pivot member, and means reducing the inherent rate of the torsion rod spring in its normal load position and increasing the effective rate thereof as the load is increased or decreased from normal and the torsion rod spring is deflected from its normal position, said means including an auxiliary spring acting on a part whose movement is a function of the deflection of the torsion rod spring.

10. The combination according to claim 8, in which that end of the torsion rod spring extending outside the tubular pivot member is attached to one end of a torsion tube enclosing the torsion rod, the other end of the torsion tube being attached to a bracket providing a bearing for the tubular pivot member, said tubular pivot member being attached to the wheel supporting lever arm.

11. The combination according to claim 8, in which the torsion rod spring extends inwardly of the vehicle from the tubular pivot member.

12. The combination according to claim 8, in which the wheel is at one end of the vehicle, the pivot axis of the wheel supporting lever arm being disposed towards the other end of the vehicle relatively to the wheel axis.

13. The combination according to claim 8, in which the part whose movement is a function of the deflection of the torsion rod spring, is, a lever arm attached to the tubular pivot member.

14. The combination according to claim 8, in which the wheel is at one end of the vehicle and the pivot axis of the wheel supporting lever arm is disposed towards the other end of the vehicle relatively to the wheel axis, the wheel supporting lever arm—in its normal position—sloping downwardly from the wheel axis to its pivot axis, whereby the moment arm of the brake reaction on the wheel, at the point of contact of the wheel with the ground and tending to turn the lever arm about its pivot axis is reduced.

15. In a vehicle suspension system having a pivotally mounted wheel supporting lever arm and a torsion rod spring resiliently resisting pivotal movement of the wheel supporting lever arm, an auxiliary spring acting on a lever arm connected to a part of the torsion rod which is torsionally deflected by the load, whereby the inherent rate of the torsion rod spring is reduced in its normal load position, and hydraulic means damping the movement of the wheel supporting lever arm.

16. In a vehicle in which a front dirigible wheel is independently supported by a wheel supporting lever arm capable of pivotal motion about an axis transverse to the normally vertical longitudinal mid-plane of the vehicle, a torsion rod spring resiliently resisting pivotal movement of the wheel supporting lever arm, and means reducing the inherent rate of the torsion rod spring in its normal load position and increasing the effective rate thereof as the load is increased or decreased from normal and a part of the torsion rod spring is torsionally deflected from its normal position, said pivot axis and torsion rod spring being disposed to the rear of the vehicle relatively to the wheel axis and being mounted on a bracket capable of dirigible swinging motion in a plane substantially normal to the axis of a king pin therefor which is inclined rearwardly from its point of intersection with the ground, the wheel supporting lever arm in its normal position sloping upwardly and forwardly from its pivot axis to the wheel spindle axis, whereby the moment arm of the brake reaction at the point of contact of the wheel with the ground and tending to turn the lever arm about its pivot axis is reduced.

17. In a vehicle in which a road wheel is mounted at one end thereof on an axis supported by a wheel supporting lever arm capable of pivotal motion about a pivot axis transverse to the normally vertical longitudinal mid-plane of the vehicle, the pivot axis being disposed towards the other end of the vehicle relatively to the wheel axis, the disposition of the wheel supporting lever arm—in its normal position—sloping downwardly from the wheel axis to its pivot axis, whereby the moment arm of the brake reaction on the wheel, at the point of contact of the wheel with the ground and tending to turn the lever arm about its pivot axis is reduced.

18. In a vehicle in which each of a pair of independently suspended road wheels is mounted on an axis supported by a wheel supporting lever arm capable of pivotal motion about an axis transverse to the normally vertical longitudinal mid-plane of the vehicle, the disposition of the pivot axis of each wheel supporting lever arm, in normally non-perpendicular relationship to the normally vertical longitudinal mid-plane of the vehicle, said pivot axis and the wheel spindle axis lying, in their normal position, in non-parallel relationship to each other and in two different substantially horizontal parallel planes.

19. The combination according to claim 18, in which the road wheels are dirigible wheels, the pivot axis of each wheel supporting lever arm being mounted on a bracket capable of swinging motion about a king pin on the vehicle frame.

20. In a vehicle in which a road wheel is mounted on an axis supported by a lever arm capable of pivotal motion about a pivot axis transverse to the normally vertical longitudinal mid-plane of the vehicle, said lever arm extending from the wheel axis to the pivot axis in a direction towards the pivot axis and the normally vertical transverse plane of the center of gravity of the vehicle, the disposition of the wheel supporting lever arm—in its normal position—sloping downwardly from the wheel axis towards its pivot axis and the transverse plane of the center of gravity, whereby the moment arm of the brake reaction tending to turn the lever arm about its pivot axis and to deflect the vehicle relatively to the wheel, is reduced to an extent such that the deflecting force due to the brake reaction may be balanced by that deflecting force due to the mass transfer from one end to the other of the vehicle, which is consequent upon braking deceleration and acts in an opposite direction.

MAURICE OLLEY.